Oct. 6, 1936.  C. D. LAKE  2,056,403
ACCUMULATING DEVICE
Filed Jan. 6, 1932  4 Sheets-Sheet 1

FIG.1.

INVENTOR-
Clair D. Lake
BY
W. M. Wilson
ATTORNEY-

Oct. 6, 1936.    C. D. LAKE    2,056,403
ACCUMULATING DEVICE
Filed Jan. 6, 1932    4 Sheets-Sheet 2

INVENTOR-
Clair D. Lake
BY
W M Wilson
ATTORNEY-

Oct. 6, 1936.   C. D. LAKE   2,056,403
ACCUMULATING DEVICE
Filed Jan. 6, 1932   4 Sheets-Sheet 3

INVENTOR
Clair D. Lake
BY
WMWilson
ATTORNEY

Oct. 6, 1936.    C. D. LAKE    2,056,403
ACCUMULATING DEVICE
Filed Jan. 6, 1932    4 Sheets-Sheet 4

FIG.6.

Patented Oct. 6, 1936

2,056,403

UNITED STATES PATENT OFFICE 2,056,403

ACCUMULATING DEVICE

Clair D. Lake, Binghamton, N. Y., assignor, by mesne assignments, to International Business Machines Corporation, New York, N. Y., a corporation of New York Application January 6, 1932, Serial No. 584,930

17 Claims. (Cl. 235—92)

This invention relates generally to improvements in accumulating devices and more particularly to an advanced form of subtracting counter.

An object of this invention is to provide a simplified and positive direct subtraction mechanism.

There is disclosed an improved accounting machine in which an automatic subtracting mechanism effects subtraction by the complemental process.

The disclosed subtraction devices are adapted to be controlled by record cards perforated in index positions representing true numbers, whether negative or positive in value. Both debit and credit items are represented as true numbers on the cards, the one class of items being subtracted from the other by automatic conversion to complements. The debit cards do not have to be perforated with a complement; the machine automatically changes such items during accumulation. The devices of the invention are effective in subtraction without the use of translating means usually provided to invert negative numbers read off cards before entry into an accumulator.

The invention is illustrated in connection with a perforated record controlled machine of the type disclosed in the patent to Daly et al., No. 1,762,145. In the machine the perforated records are fed under two sets of sensing brushes in electric circuits. When the cards pass the lower brushes, impulses directed through the perforations at differential times serve to control the actuation of a counter of the Hollerith type such as that disclosed in the Lake Patent No. 1,307,740.

Addition is performed in the usual way by the timed energization of counter magnets controlling the clutch connections to the counter elements. The cards carrying a debit or negative item have a special perforation which registers with one of the upper brushes to close a subtraction control circuit and condition the accumulating devices for the addition of the complement of the number on the card instead of the addition of the true number. The devices of the present invention are concerned with the means for entering the complement during subtraction.

In subtraction, the regular counter magnets are energized early in the operating cycle, the clutch connections are made and the counter elements move to add the complement of the negative number present on the record card. By the time a perforation in the card reaches the sensing position the related counter element has moved through a number of steps that is the complement of the number represented by the perforation on the card. The counter element is then ready to be declutched. The declutching operation is initiated by an impulse directed through the perforation in the card to energize a counter release magnet. The armature of this magnet is connected to a throw-out pawl which in turn is connected to a related counter clutch lever. When the pawl is moved by the magnet it is pulled in the path of teeth on a rotating shaft. The positive movement of the shaft is transmitted through the pawl to the clutch lever which is then swung clear, disengaging the clutch and releasing the counter element. At the same time an overthrow preventer having connections to the counter release magnet is positioned in cooperation with the counter element to hold it at the complemental setting. There is also provided an actuator for the armatures of the regular magnets to insure the relatching of the counter clutch levers when they are positively moved to normal position.

The declutching devices have adjustable connections to the throw-out pawls so that the actuation timing may be varied to insure the proper release of the counter elements.

An object of the invention is to provide an improved totalizer arrangement comprising a single set of accumulating wheels to take care of the entry of credit and debit items. The wheels are positioned by credit and debit entries and indicate a number representing the balance.

A feature of the invention is the positive operation of the counter throw-out connections at a differential point in a subtraction operation in order to add a complement. The connections also serve to simultaneously position an overthrow stop and operate an armature latch to hold the counter clutch arm disengaged.

Another feature of the invention is the provision of an overthrow lock which prevents extra movement of a counter element when it is stopped after moving a complemental extent. An adjustment may be made in the overthrow lock connections to accurately position the same.

Another feature of the invention is the use of the positive counter wheel disengaging means in two ways; for declutching at a differential point in the adding cycle after a complemental entry in subtraction, and for declutching at the end of the adding cycle after the entry of a true number in addition. The disengaging means is selectively conditioned for one use or the other by the presence or absence of a special perforation in record cards.

Other objects, uses and advantages of the present invention will be hereinafter pointed out in the specification and claims, and shown in the drawings, which show by way of illustration what is now considered to be the preferred embodiment of the invention.

Figures 3, 8:
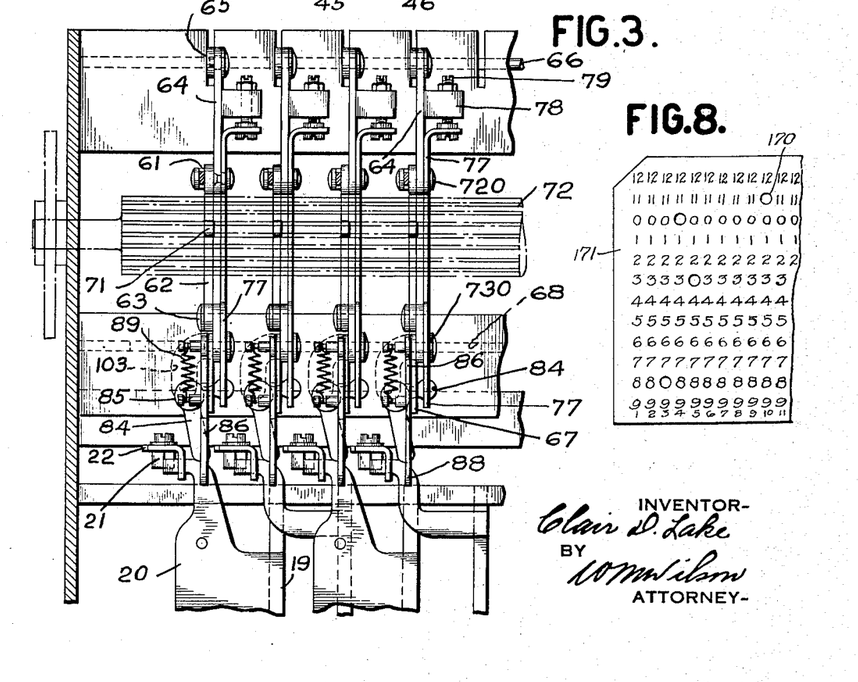
Fig. 3 is a rear sectional elevation view taken along the line 3—3 in Fig. 1, and showing the counter clutch arm operating means.
Fig. 8 is a detail view of a portion of a record card perforated to represent a negative amount of 803.
Figure 6:
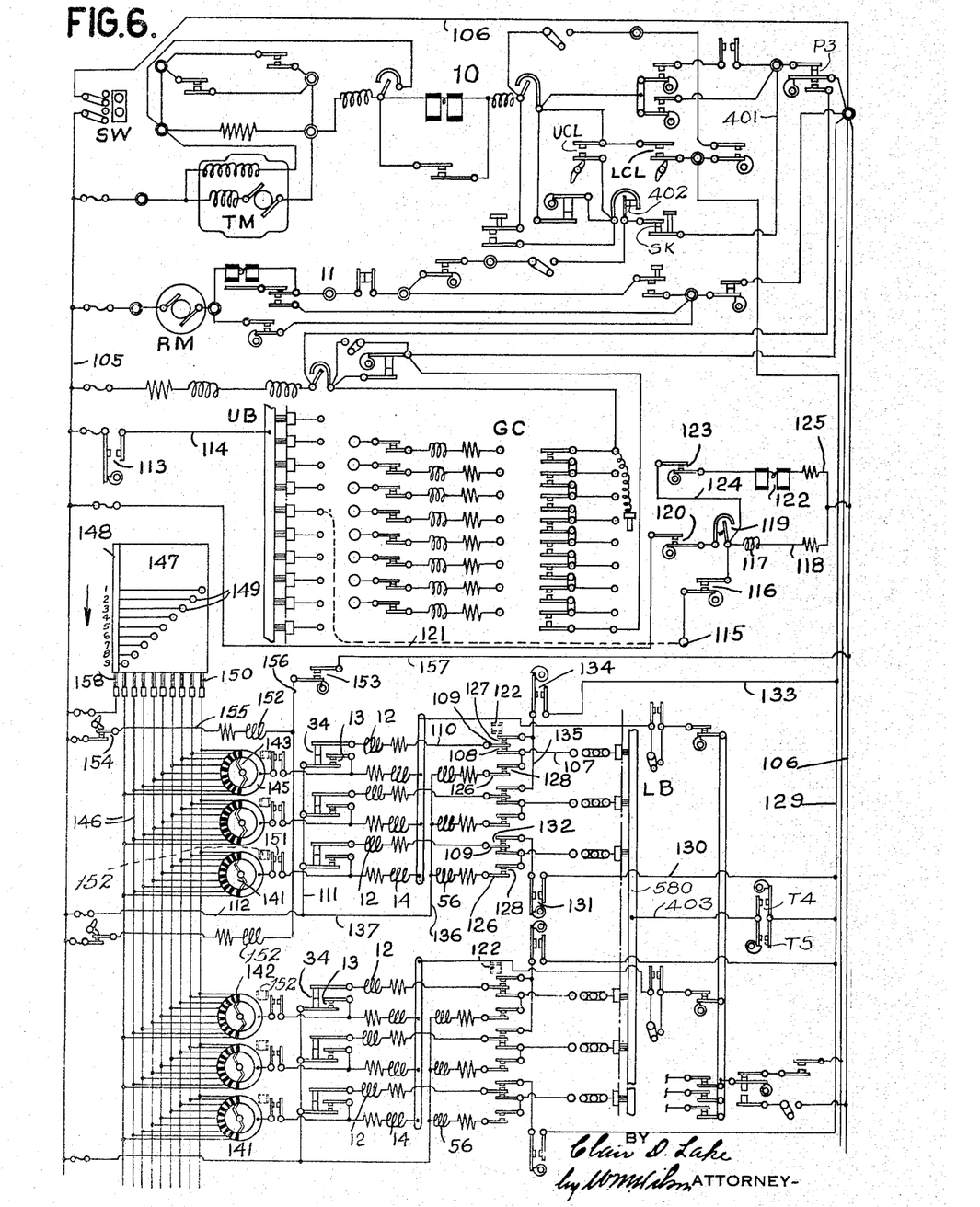
Fig. 6 is a wiring diagram of the machine.

The diagram in Fig. 6, with the exception of the wiring of the counter mechanism, is similar to that shown in the patent of Daly and Page, previously referred to and British Patent 356,304. During adding operations the machine is driven by a tabulating motor TM controlled by a group of cam and relay controlled circuits indicated at 10, and is driven during total taking operations by a reset motor RM controlled by a group of circuits, contacts and relays designated generally at 11. When the tabulating motor TM is in operation it feeds the usual perforated tabulating cards 171, Fig. 8, bearing differentially arranged index points representing digits, first, beneath the upper analyzing brushes UB and exactly one machine cycle later beneath the lower analyzing brushes LB. By means of the group control mechanism indicated generally at GC, groups of cards, as represented by the same data entry in certain selected columns, may be operated upon separately, the items of each group being accumulated and the total of them taken before the machine begins operation on the following card group.

As the perforated cards pass the lower brushes their index points instantaneously close circuits through the proper lower analyzing brushes LB to energize counter magnets 12. Usually the timed energizations of these magnets control mechanism for entering the data corresponding to the card reading on the counter wheels. During ordinary adding operations, when any counter magnet 12 is energized it causes contacts 13 to close energizing a printer magnet 14 to select the type corresponding to the entered data for printing. In this fashion the items may be listed as accumulation is carried on. When used for subtracting, the machine may be conditioned for tabulating control to eliminate the printing of items, thereby printing totals or balances only.

Figure 1:
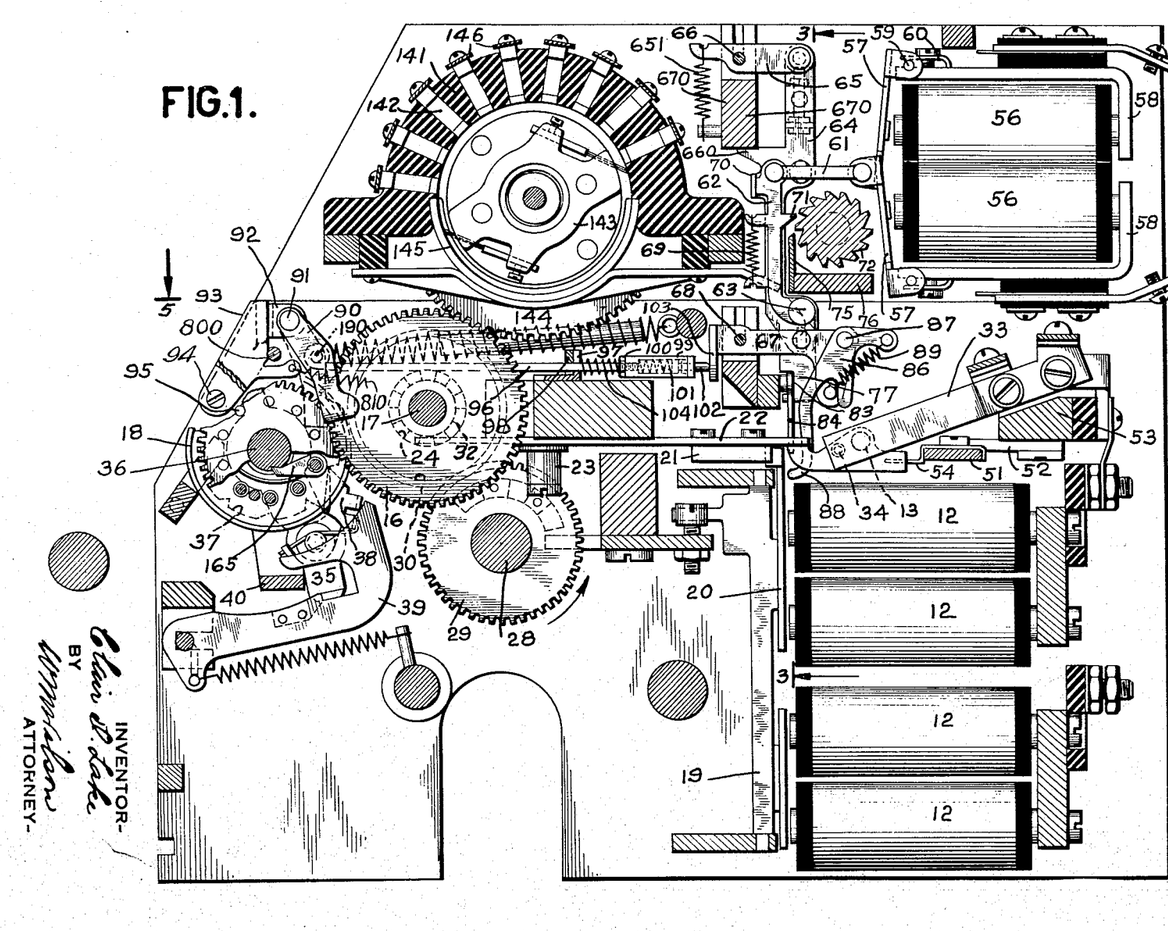
Fig. 1 is a sectional elevation view of the accumulator and control devices.
Figure 5:
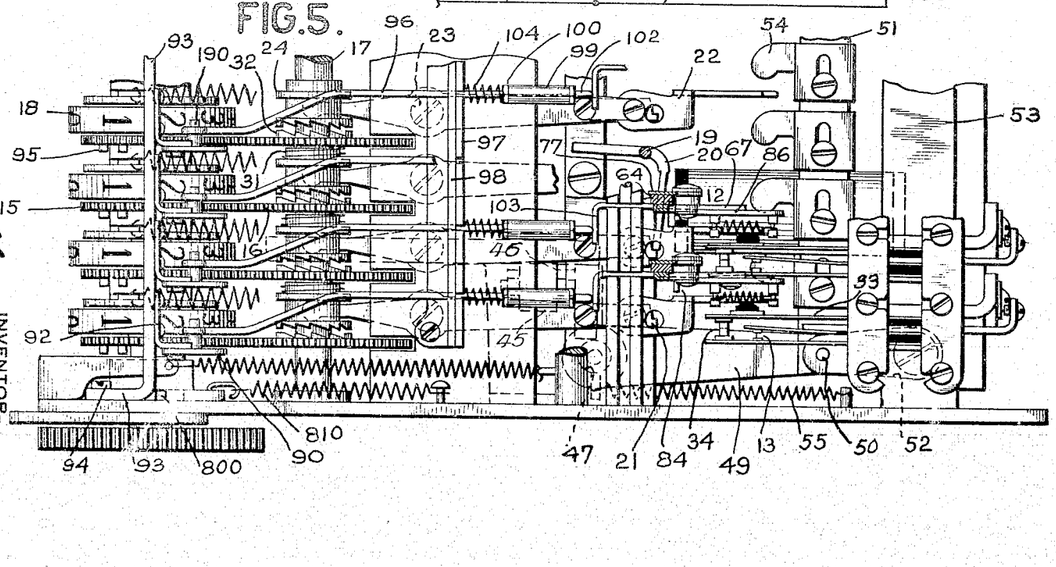
Fig. 5 is a plan view taken along the line 5—5 in Fig. 1, and showing the accumulator wheel clutches and control devices.

Referring to Figs. 1 and 5, the accumulating or counter wheel gears 15 are in mesh with gears 16 driven by a shaft 17 under control of the counter magnets 12. The indicating wheels 18 are fixed to the counter elements so that the data entered in the counter may be visually indicated.

There is a controlling magnet 12 (Fig. 1) for each register gear 15 and the magnets are arranged in two horizontal rows staggered in position. Coacting with each magnet is a vertical rod 19 (Figs. 1, 3 and 5) pivoted on the frame and carrying an armature 20 facing the magnet pole. An extension on this pivoted armature structure engages a stop 21 at the outer end of a clutch lever 22 pivoted on a screw 23. The other end of the clutch lever is rounded and fits in a groove cut into a clutch collar 24 (Fig. 5) rotatable with shaft 17 constantly driven by the tabulating drive shaft 25 (Fig. 2) through a train of gearing comprising gears 26, 27, shaft 28, gears 29 and 30 (Fig. 1). Upon energization of magnet 12, armature 20 is attracted and oscillates on the frame so that the extension disengages the stop 21 on the clutch lever. The latter being unlatched, permits coil spring 31 (Fig. 5) to move the clutch collar teeth into mesh with coacting teeth 32 on the gear 16 freely rotatable on shaft 17, whereupon gear 16 starts to rotate and through the gear 15 on the counter wheel, turns the counter wheel on its shaft.

The right end, Fig. 5, of each clutch lever when latched abuts against an insulation button on a related flat spring 33 which constitutes one member of contacts 34. When unlatched, the clutch levers permit the springs 33 to move outwards opening contacts 34. When closed these contacts establish the card sensing circuits; they open to prevent arcing at the sensing brushes.

As in the patents referred to hereinbefore, the magnets 12 are energized at a point in the cycle proportional to the value of the designation on the ordinary Hollerith card 171. The designations are usually in the form of perforations variously located from a given datum line in fixed index positions. The value of a perforation is fixed by its index position. As the card feeds past the analyzing brushes, the positions successively reach the brushes at correspondingly successive points of the cycle. When a perforation encounters the brushes, the latter contact therethrough and complete a circuit energizing magnet 12 at a time proportional to the value of the perforation. The energization of the magnet effects rotation, in the manner described, of the corresponding counter wheel which turns an amount corresponding to the value of the perforation. For example, if a "9" perforation be sensed by the brushes, the wheel will rotate through nine digit spaces. If the wheel initially reads 0, after rotation through nine digit spaces it will read 9. However, if the wheel initially reads 2, after rotation through nine digit spaces, it will read 1 and hence a transfer must be effected to the counter wheel of the next higher denominational order to turn the latter one digit space.

The transfer devices (Fig. 1) are of a well known form, including levers 35 mounted on counter shaft 36, one lever alongside each counter cam wheel 37. A pawl 38 on lever 35 cooperates with the cam and when operated by the passing of the wheel from nine to zero, serves to depress a latch arm 39 holding the higher order lever 35 in normal position. The released lever carries the attached pawl 38 to the left one step around the notched wheel, in position to operate the wheel. The transfer movement of levers 35 is actuated by bail 40 through connections effective at the proper time after adding.

Figure 2:
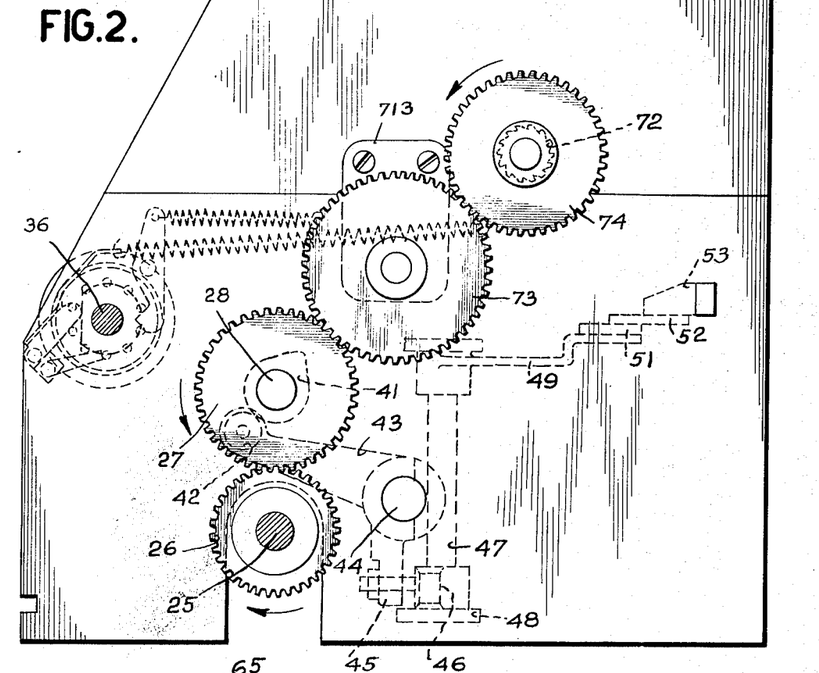
Fig. 2 is a side elevation view of the driving connections to the counter declutching operating shaft.

As pointed out, the clutch levers 22 are selectively unlatched by armatures 20 upon energization of the magnets 12 during the adding cycle. At the end of the adding cycle, the released clutch levers must be relatched by the armatures to thereby disengage clutch collars 24 from the counter wheel actuating gears 16, and thus stop rotation of the counter wheels. The relatching operation is effected during a card cycle by the following mechanism:

Referring to Fig. 2, coacting with the cam 41, rotated once per card cycle from the main shaft, is a follower 42 mounted on one arm of a bell crank 43 pivotally mounted on shaft 44. Cam 41 has a projection designed to give said bell crank 43 a thrust each card cycle after the adding operation is effected to move said bell crank in a counterclockwise direction. The other arm 45 of the bell crank bears against an extension 46 fixed at an angle to the vertical shaft 47 rotatably journalled in the frame 48. At the opposite end of the aforementioned shaft 47 is fixed an arm 49 pivoted by means of pin 50 (Fig. 5) to one end of a flat bar 51 extending the width of the counter. Pivotally connected to each end of bar 51 are similar links 52 which are swingably mounted on the frame on brace rod 53.

Figure 7:
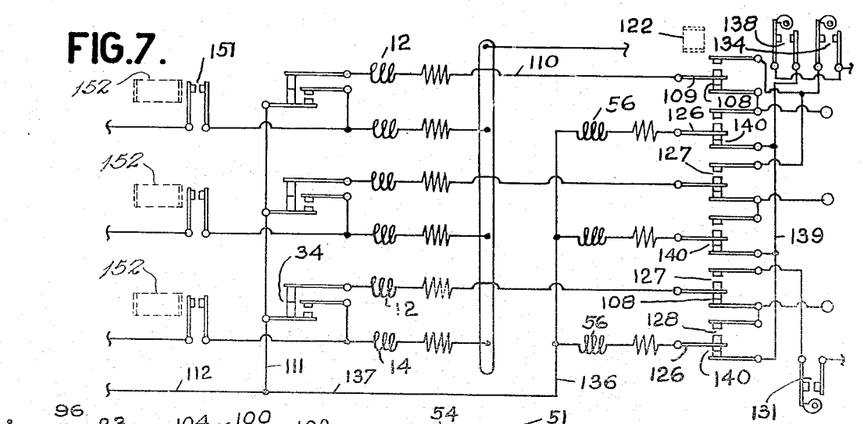
Fig. 7 is a wiring diagram of the control of the subtraction counter to take care of accumulator wheel declutching in adding operations.

A plurality of similar members 54 adjustably mounted on bar 51 are provided with projections adjacent the free ends of the clutch levers 22, as shown in Fig. 5, there being a member 54 for each clutch lever. When cam 41, Fig. 2, rocks the bell crank 43 counterclockwise, arm 45 thereof engages extension 46 on shaft 47, thus rocking shaft 47 clockwise against the resistance of a spring 55 (Fig. 5). Arm 49 fixed to shaft 47 thereupon actuates bar 51 downward, as viewed in Fig. 5, with the result that the projections on members 54 move towards clutch levers 22 and press against the ends of those clutch levers which have been unlatched, moving the stops 21 on said levers behind armature latches 20 which thereupon engage the stops to relatch the levers. This relatching action occurs at the end of the adding cycle. The relatching devices described above may be omitted when the wiring connections to the subtraction counter are made as shown in Fig. 7. The wiring diagram in Fig. 7 and the use of a positive declutching device for both subtraction and addition will be described herein, after the description of the subtraction mechanism.

It is noted from the foregoing description that adding operations are performed by establishing a clutch connection to drive an accumulator wheel when a perforation is in registration with the correlated analyzing brush and continuing such relation until the end of the cycle. For example, if a "two" perforation is analyzed, the clutch connection is established at the "seven" point in the cycle and discontinued at the "nine" point to cause an entry of two units on the related accumulator wheel.

Subtracting operations are effected by the complemental process based upon the theory that one number may be subtracted from the other by the addition of the true complement of the subtrahend. In record controlled machines, it is desirable that the perforated data represent only the true number of an amount to be subtracted because in certain tabulating operations it may be desirable to employ such cards for accumulating amounts as well. The conversion of the true numbers to true complements is automatically effected by the present machine.

In the event that the perforation represents a value of two it will be recognized that the "nines" complement or seven units must be entered in the adder unit to subtract by the complemental process. In the present machine such operations are taken care of for all orders above the units by energizing all the accumulator magnets 12 at the beginning of the subtracting cycle so that the armatures 20 release the levers 22 and the clutch devices will immediately cause the accumulator element to be turned. Such rotation continues until a perforation is analyzed, causing energization of a subtraction magnet and disestablishment of the clutch device. As this is the point at which the clutch device is rendered effective in ordinary accumulating operations it will be understood that the adder element receives a complemental entry. The structural details whereby the clutch is rendered ineffective at differential times coincident with the perforations reaching the analyzing brushes may best be understood by reference to Figs. 1, 3 and 5.

As shown in Fig. 1 the subtraction magnets 56 are arranged in two rows in order to place a plurality of them in a limited space. The armatures 57 cooperating with the magnets are pivoted alternately at upper and lower points on the magnet support frames 58 to avoid interference with each other. The pivot rod 59 for the armature lies in a notch cut in the bracket supporting frame 58 and is held in position by a removable clip 60. To the end of each armature is pivotally secured one end of a link 61 the other end of which is pivoted to the top of a pawl 62. This pawl is pivoted at 63 on the side of the long link 64 suspended between an upper arm 65 pivoted at 66 and a lower arm 67 pivoted at 68. The rods 66 and 68 lie in slotted frame members and are removable with the top of the counter. A spring 651 urges arm 65 in a counter clockwise direction and lifts link 64 until an extension 660 engages frame 670. A spring 69 is stretched between projections on pawl 62 and link 64 to urge the pawl in a counterclockwise direction holding the upper end of the pawl against a lug 70 on the side of the link 64. From the other side of the pawl there projects a tooth 71 adapted to cooperate with a rotating ratchet gear or notched shaft 72. The connections for driving the notched shaft may be noted in Fig. 2. There it is noted that an idler gear 73, removably mounted on bracket 713, meshes with the gear 27 already mentioned and also meshes with a gear 74 fastened to the end of the notched shaft 72. The gearing connections between the clutch driving shaft 17 (Fig. 1) and the ratchet gear 72 are so proportioned that the two shafts move in synchronism. The clutch hub 24 is provided with the same number of teeth as the ratchet gear 72.

Figure 4:
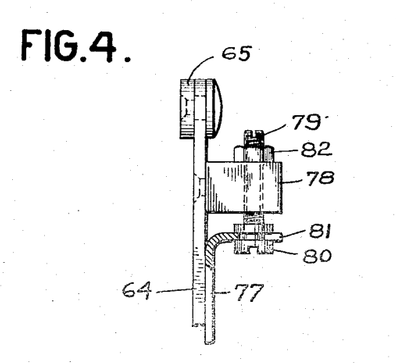
Fig. 4 is a detail view of the adjustment provided on the counter clutch disengaging connections.

The ratchet shaft is rotated continuously during the accumulating operation. At that time, should any of the magnets 56 be energized, the related pawl 62 is drawn into cooperation with the ratchet teeth on the rotating shaft. The tooth 71 on the pawl is then pushed downwardly until the lower camming surface on the tooth cooperates with a vertical plate 75 adjustably mounted by a screw and slot connection (not shown) on a stationary bar 76. Thus, the pawl is automatically cammed out of engagement with the ratchet gear. The downward movement of the pawl 62 is transmitted through the connection to link 64 to a slide 77 (Fig. 3) mounted on studs 720 and 730 on the side of link 64. Between the link and the slide there is provided the adjustable connection shown in Figs. 3 and 4. There it is noted that the tapped stud 78 mounted on the side of link 64 holds a threaded adjustment screw 79 having a shouldered head 80 into the grooved portion of which extends the forked end 81 of the slide 77. A screw slot in the top of the screw makes easy the vertical adjustment of the slide 77; the adjustment once made is held by the lock nut 82.

The lower end of the slide 77 is provided with a notch 83 (Fig. 1) which confines one end of a bell crank 84 (Fig. 3) pivoted at 85 on a stationary portion of the counter frame. The lower vertical arm of the bell crank 84 reaches alongside a related clutch lever 22 and is contacted by the clutch lever when the lever is released from the armature 20. The clutch lever 22 is released to effect adding as explained hereinbefore.

When the slide 77 is lowered through the connections already mentioned, the bell crank 84 is rocked in a clockwise direction (Fig. 3) and acts to swing the clutch lever 22 to the left until the latching block 21 on the clutch lever is in position to be latched by the armature 20.

To ensure the latching of the operated clutch levers an armature knock-off member 86 is pivoted at 87 on the link supporting arm 67. When the link 64 is lowered the supporting member 67 is rocked in a clockwise direction about pivot 68 carrying along with it member 86, the lower end 88 of which contacts the side of the armature 20 (Fig. 1) acting to overcome any residual magnetism holding the armature against magnet 12, and forcing the armature into clutch lever latching position.

A spring 89 connected between member 86 and a stud on arm 67 serves to hold the member 86 in position, and also provides a yielding connection between the positive clutch lever knock-off and the armature positioning means.

The positive actuation of the ratchet gear 72 also serves, through connections about to be described, to position overthrow preventing pawls 90 (Fig. 1) pivoted at 91 on ears 92 extending from the side of the cross bar on a bail 93 pivoted at 94, Fig. 5, to the side of the counter frame. The bail is formed with a pair of arms both of which are pivoted in the same fashion on the opposite side frames. Each pawl 90 cooperates with a set of pins 95 extending from the side of one of the accumulator gear wheels 15. When the accumulator wheel is rotated in its normal counterclockwise direction the pins 95 pass the end of the pawl 90 in succession. At the time a counter element or wheel is de-clutched from the positive driving connections, an operation of the pawl places it between a pair of pins and tends to hold the index wheel in the proper one of its digit indicating positions. The pins 95 may be driven a short distance after the pawl gets into their path. Therefore, the pawl is mounted flexibly so that it does not form a positive stop. The pawl is pivoted at 91 so that it may swing and yield to the right (Fig. 1) and it is mounted on the movable bail 93 so that both the bail and pawl may rock as a unit in a counterclockwise direction about center 94, thus allowing the pawl to rise a short distance if a pin 95 pushes at the lower end. However, the wheel is brought back to the proper position by the pawl which returns to a locating position under the urging of springs influencing the bail and the pawl as described hereinafter. The bail 93 (Figs. 1 and 5) is urged into normal position against a stop stud 800 on the counter side frame by a spring 810 connected between an arm on the bail and a stud in the side frame. The pawl is operated by connections to the lower arm 67.

To the stud 190 on the pawl 90 is pivoted one end of a rod 96 the other end of which is guided by bracket 97 and held in position by a slotted plate 98. The extreme end of the rod 96 is threaded and screwed into the cylinder 99 and held against the same by a lock nut 100. In the cylinder is a spring 101 pressing against one end of a plunger 102, the other end of which abuts against an extending flange 103 on the front end of the link 67. When the link 67 is rocked by reason of the actuation of the pawl 62 by ratchet 72, the lower end of flange 103 is rocked to the left (Fig. 1) pushing against plunger 102 and through spring 101 moving the rod 96 and carrying the overthrow pawl 90 into cooperation with the related accumulator wheel. A light spring 104 on rod 96 pressing between the bracket 97 and the nut 100, normally holds the overthrow pawl out of locking position. It is noted that by turning lock nut 100 and cylinder 99 the rod 96 may be moved horizontally adjusting the position of the pawl 90.

From the above it may be gathered that during a subtracting operation when an impulse is directed through the subtraction magnet 56, a pawl 62 cooperates with the ratchet wheel 72 and through the connections already described the clutch connection driving the related counter element is opened, and the clutch lever is latched by the associated armature which is moved by the knock-off member, and at the same time an overthrow pawl is positioned to hold the released counter element in its last adjusted position after the entry of a complement.

Turning now to the wiring diagram shown in Fig. 6, to describe the manner in which impulses are directed through the magnets 12 to control an adding operation, and how impulses are directed through magnets 12 and 56 to control a subtraction operation. When the switch SW is closed, a circuit is established through the lines 105, 106. During adding operations at a differential point in the analysis of the card an impulse is directed through the lower brushes from line 106, through upper contacts P3, wire 401, stop key contacts SK, contacts 402, upper card lever contacts UCL, lower card lever contacts LCL, wire 129, contacts T4, T5 timed to close at the card index points, wire 403, common contact plate 580, through the card to lower brushes LB and the plug sockets, a plug wire to wire 107, through contacts 108 and contact lever 109, wire 110, counter magnet 12, contacts 34, bus bar 111, and wire 112, to the other side of the line 105. As explained hereinbefore, this impulse acts to move the armature 20 releasing the clutch lever 22 and engaging the counter element with the driving means until the end of the adding operation when the clutch connection is disengaged by the operation of projections 54 (Fig. 5). The differentially timed impulses from the lower brushes follow a different course in subtraction because then contact lever 109 is shifted.

In order to prepare the machine for subtraction operations the record cards carrying a negative or debit number are provided with a special perforation 170, usually in the "11" index position. Cooperating with the column of the card containing this perforation is one of the upper brushes. Through the upper brush, electrical connections are made to hold the switching contact lever 109 in an operated position to change the manner of controlling magnets 12 and also to direct impulses into subtraction magnets 56 through shifted contact levers 126.

The wiring connections to the subtraction conditioning control are as follows: From line 105, through contacts 113, closed during card analysis on every card reading cycle, wire 114, the upper brush cooperating with the column containing the special perforation 170, a plug wire, to jack 115, contacts 116, closed as the special index point is passing the analyzing position, through magnet 117 and wire 118, to the other side of the line 106. When an impulse is directed through relay magnet 117 the associated contacts 119 are closed and when another set of contacts 120 are closed mechanically before the opening of contacts 116, a holding circuit is established running from line 105, through wire 121, contacts 120, relay contacts 119, magnet 117, and wire 118, to the other side of the line. Arranged in parallel with the magnet 117 is a magnet 122 which controls the positioning of the contact switches 109 and 126. The contacts 123 arranged in series with the magnet 122 are closed before the card carrying the subtraction item is presented under the lower analyzing brushes. When these contacts are closed the magnet 122 is held energized by means of the connections through wire 121, contacts 120, contacts 119, wire 124, contacts 123, magnet 122 and wire 125 to the line 106. After the record card passes the zero position, contacts 123 are opened deenergizing the subtraction control magnet 122. Just before the special index hole 170 reaches the analyzing position under the upper brushes the contacts 120 are opened to deenergize the relay magnet 117 and condition it for testing the record being sensed to determine whether it carries a positive or a negative number.

When the subtraction control magnet 122 is energized it serves to open the contacts 108 normally directing the differential timed impulses from the lower brushes into the adding counter magnet 12, and closes contacts 127 to energize the counter magnets 12 at the beginning of the subtracting operation. The control magnet 122 also shifts switch levers 126 to close contacts 128 having connections to the lower brushes in order to direct the differentially timed impulses through the subtraction magnet 56. During subtraction operations the lowest order counter magnet 12 is energized one point before the other magnets in order to add the "elusive one" and complete the complement. The units order magnet 12 is energized one point before the nine index position on the card is beneath the lower brushes, and the other higher order magnets are energized at the nine position. The units order counter magnet is energized by means of the following connections: From the right side of line 106, contacts P3, wire 401, contacts SK, contacts 402, contacts UCL, through LCL contacts closed by a card under the lower card levers, wire 129, wire 130, contacts 131 closed at a time corresponding to one index point position before the nine position, contacts 132, contact lever 109, wire 110, counter magnet 12, contacts 34, bus bar 111 and wire 112 to the line 105.

The higher order counter magnets are energized through wire 129, wire 133, contacts 134 closed at the "9" position, bus bar 135, contacts 127, contact lever 109, wire 110, counter magnet 12, contacts 34, bus bar 111 and wire 112 to the line 105. With all the counter magnets thus energized at the beginning of the subtraction operation, the clutch levers 22 are tripped closing the clutch connections between the counter elements and driving means, and the accumulator wheels start to rotate and continue to move until they are individually declutched by the positive actuation of the clutch releasing devices shown in Fig. 1.

The wiring connections controlling the energization of subtraction magnets 56 which in turn control the positive declutching mechanism will now be described. In a subtracting operation, since the contact levers 109 and 126 are lifted (Fig. 6) by the control magnet 122, the contacts 108 are opened breaking the connection between the lower brushes and the counter magnet 12 while the contacts 128 are closed making a connection between the lower brushes and the subtraction magnets 56. An impulse directed through a lower brush under control of the record card on a subtraction operation goes from the lower brush through a plug wire, wire 107, contacts 128, contact lever 126, magnet 56, bus bar 136 and wires 137 and 112 to the other side of the line 105.

The various magnets 56 are energized differentially according to the position of the perforation in the related column on the card. The energized magnet 56 acts to throw the pawl 62 in cooperation with the ratchet wheel 72 (Fig. 1) and through the positive drive connection, described hereinbefore, the associated counter wheel is declutched at the differential point, thus stopping the counter element after the entry of the complement of the number represented on the record card in the related column.

In Fig. 6 two counters are shown each comprising three banks or orders of accumulating elements. It is obvious that the principle of operation may be expanded to actuate accumulators having a larger number of orders and also that a larger number of accumulators may be provided in the machine.

In Fig. 7 is shown another way of wiring the accumulator for control in addition and subtraction. With the wiring arranged in this manner the positive declutching devices shown in Fig. 1 may not only be used for the declutching of the counter elements at the differential point during subtraction operation, but also used to declutch the counter wheels at the end of an adding operation. When this form of control is used, the train of connections operated by cam 41 in Fig. 2 and including the clutch lever releasing extensions 54 in Fig. 5 may be left out of the machine as the same function is performed by the positive declutching devices operated by the ratchet wheel 72 (Fig. 1) under control of the subtraction magnet 56. With this form of control the subtraction magnet is energized for both adding and subtracting types of operation. During adding operations the magnets 12 are energized to clutch the counter elements in the usual way. Then the magnets 56 are energized at the end of an adding cycle by connections reaching from the right side of the line, through contacts 138 closed at the zero index position, through bus bar 139, contacts 140, contact lever 126 which is in its lowered position during adding operations, through magnet 56, bus bar 136, wire 137 and wire 112 to the other side of the line. The energization of magnet 56 serves to declutch the counter elements at the end of the adding cycle by means of the mechanism shown in Fig. 1 described hereinbefore. For a subtraction cycle the contact levers 109 and 126 are raised (Fig. 7) by the subtraction control magnet 122 and close contacts directing impulses through the magnets 12 and 56 in the same manner as that described in connection with Fig. 6.

It is noted hereinbefore that printing of items is initiated during ordinary adding operation by differentially timed impulses directed through printing magnets 14 at the same time that magnets 12 are energized. The armature of the printing magnet is connected by a call wire to a pawl which is adapted to stop a type bar in one of its printing positions. By means of connections from the motor TM the type bar is moved in synchronism with the feeding of the record card under the sensing means, and thus the impulse directed through the differentially located perforation, acts through the printing magnet to stop the type bar in a position to print the numeral corresponding to the index value of the perforation. Since the printing structure used is well known in the art and described in detail in British Patent 356,304, no further explanation of its operation in listing is thought necessary.

After the entry of credit and debit items into the accumulator it is often desirable to print a total to record the balance indicated on the accumulating wheels. The balance is present in the accumulator as a true number or as a complement according to which class of items predominate. In other words if the amounts added are greater than the amounts subtracted, the balance is in the accumulator as a true number; if conditions are reversed, the balance is shown as a complement of a true negative number.

The total taking devices about to be described are of the kind disclosed in British Patent 356,304. Referring to Fig. 1, at the upper part of the view it is noted that the totaling devices comprise a commutator 141 provided with segments 142 corresponding in number and position to the several digit indicating positions of the counter wheel 15.

A brush structure 143 is mounted on a gear 144 driven by the gear 16 which drives the counter wheel 15 so that the brush structure is angularly displaced according to the reading on the counter wheel. The structure carries two brushes, one of which engages the segments 142 and the other of which engages a common segmental conductor 145 whose surface corresponds to the configuration of the commutator. Each group of segments 142 corresponding to the same digit are connected to a common conducting bar 146 whereby all the "9" segments are in multiple, all the "8" segments in multiple, etc., see Fig. 6.

The type bars used in securing an item record impression are also used in total printing. During total taking, however, connections from the reset motor RM serve to raise the type bars in synchronism with the total taking operation so that the type successively pass the printing position opposite the platen. The type bar is stopped in the proper differential position by the same printing magnet 14, call wire, and pawl used in item printing. But the impulses directed through the printing magnet are controlled by an emitter for successively energizing the bars 146 and the brushes 143 associated with the accumulator elements.

The device for emitting the timed impulses synchronized with the movement of the type bars to select the type for printing, is shown diagrammatically in Fig. 6. This emitter consists of an insulating shell 147 suitably mounted on the total shaft so that it rotates in synchronism with the rise of the type bars during total taking. This emitter is provided with a continuous contact ring 148 and a plurality of contact spots 149, each of the latter being electrically connected to the ring 148.

The spots 149 are displaced from each other both laterally and circumferentially, the circumferential spacing being such that each spot reaches a reading line formed by brushes 150 as the type corresponding to it on the type bar is passing printing position. The lateral offset of the spots 149 permits each to cooperate with a separate brush 150. These brushes are electrically connected with the bars 146 connecting the common commutator segments 142.

Hence it will be understood that each set of commutator segments 142 receives a timed impulse from the emitter at the time when the type corresponding to the segment is passing the printing line.

In order that there may be no possibility of the totaling circuits interfering with the listing circuits during adding operations, provision is made for entirely disconnecting the commutators 141 and emitter 147 from the printing magnets during listing operations. This consists of relay contacts 151, one pair being in series with the total printing circuits of each printing magnet 14. A group of these contacts 151 is operated from a coil 152 whose energization is controlled by cam contacts 153 operated from the total shaft. During adding and listing operations contacts 153 are open but during totaling they close to energize the magnet 152 which energization results in the closing of associated relay contacts 151. The circuit through magnet 152 runs from line 105, contacts 154, wire 155, magnet 152, bus bar 156, contacts 153, and wire 157 to line 106.

The total taking operation will now be briefly summarized with reference to Fig. 6. The brush sets 143 during previous adding and/or subtracting operations of the machine have been positioned according to the data reading of their associated adding wheels. Consequently one brush of the set rests upon a commutator segment 142 corresponding to the reading of its wheel and the other brush rests on the segmental conductor 145 which is connected to the printing magnet 14 through relay contacts 151. The emitter 147 which is driven during total taking brings its spots 149 successively into cooperation with the brushes 150 so that each of the bars 146 receives an impulse at the time when the type corresponding to them is passing printing position. As the "9" spot 149 passes its brush 150 the printer magnet of each counter wheel which stands at "9" receives an impulse to select the "9" type for printing. The circuit extends as follows: from brush 158 connected to one side of the line to common conducting ring 148 of the emitter, thence through "9" spot 149 and its brush 150 and bar 146 to all the "9" segments of the commutators 141. If "9" is to be printed, a brush 143 will be in contact with this "9" segment and the circuit will be extended through the brush set 143 and segmental contact 145 to relay contact 151, thence through the printing magnet 14 and back to the other side of the line. In this fashion all type which are to print "9" will be positioned opposite the platen. The remaining type will be positioned to select other numbers in a similar manner according to the setting of the brush set 143 which corresponds to the counter reading. Thus in a single revolution of the emitter 147 all type which are to total print will be properly positioned opposite the platen to print all the data represented on the several counter wheels.

At times it is desired to reset the counter wheels to normal zero position during total taking operations. This may be accomplished by connecting the counter wheel supporting shaft 36 (Fig. 1) to the reset motor drive. The reset shaft 36 is notched to engage the pawls 165 mounted on the side of the counter wheels. In a single counter-clockwise rotation the shaft engages all the pawls and moves all the wheels to normal position.

It will be understood that various omissions and substitutions and changes in the form and details of the device illustrated and changes in its operation may be made by those skilled in the art without departing from the spirit of the invention. I intend to be limited therefore only as indicated by the scope of the following claims.

I claim:—

1. In a machine of the class described, an accumulating device comprising a plurality of adding wheels, an actuator for said wheels, clutches associated with said wheels for individually engaging and disengaging said wheels and said actuator, a notched driving member, pawls having connections to said clutches, and means for bringing said pawls individually into cooperation with said driving member to operate said clutches.

2. In a machine of the class described, an accumulating device comprising a plurality of adding elements, a driving means, devices for individually connecting said elements with the driving means, a plurality of pawls, one for each element, said pawls having connections to said devices, a rotating ratchet gear, and means for bringing any of said pawls into cooperation with said gear to disconnect the related elements from the driving means.

3. In a machine of the class described, an accumulator comprising a plurality of adding elements, a driving means, means for engaging the elements with said driving means, means for operating said engaging means at differential times to add amounts, control devices for changing the operation of said operating means to cause said engagement early in the cycle of said driving means, a moving operating member, and connections to said engaging means adapted to be brought into the path of said operating member and actuated thereby to disengage said elements at differential times to enter a complement.

4. In a machine controlled by records containing negative amounts, an accumulator comprising a plurality of adding elements, a driving means, means for individually engaging the elements of said accumulator with said driving means, a constantly moving operating member, connections to said engaging means, and means under control of said records for bringing said connections into the path of said operating member at differential times to be actuated and thereby disengage said elements from said driving means after the entry of a negative amount.

5. In a machine of the class described, an accumulating device having an accumulating element, a driving means, devices for connecting said element with the driving means, a pawl, a rotating ratchet gear adjacent said pawl, adjustable connections between said pawl and said devices for adjusting the position of said pawl relative to said gear, and means for moving said pawl into cooperation with said gear to disconnect said element from the driving means at differential times.

6. In a machine of the class described, an accumulating device having an adding element, a driving means, devices for connecting said element with the driving means, an operating pawl having connections to said devices, a constantly rotating ratchet gear, means operable at differential times for bringing said pawl into cooperation with said gear which then operates the pawl and said devices to disconnect said element from the driving means, and means operated by said pawl and cooperating with said element to prevent overthrow after disconnection.

7. In a machine of the class described, an accumulator, having accumulating elements, means for operating said elements, means for engaging said elements with said operating means differentially to initiate an adding operation, and also adapted to engage said elements with said operating means at the beginning of a cycle for subtraction, a moving ratchet member, connections on said engaging means, and means adapted to bring said connections into a position to be operated by said member to disengage said elements from the operating means at the end of an adding operation and disengage them differentially during a subtraction operation.

8. In a machine of the class described, an accumulator having accumulating elements, means for operating said elements, means for engaging and disengaging said elements and said operating means, means for operating said engaging means to engage said elements early in a cycle for complemental entries, said means also being adapted to operate said engaging means to engage said elements at differential times during a cycle for true number entries, a rotating notched member, pawls adapted to cooperate with said member for operation, connections between said pawls and said engaging means for disengaging said elements when said pawls are operated by said notched member, and means adapted to bring said pawls into cooperation with said member at differential times after complemental entries or to bring the pawls into cooperation with said member simultaneously after true number entries.

9. In a machine of the class described, an accumulator having accumulating elements, means for operating said elements, means for engaging and disengaging said elements with said operating means, other means for operating said engaging means at differential times to initiate an adding operation, said other means also being adapted to operate said engaging means to engage said elements with said operating means at the beginning of an operation for subtraction, a moving ratchet member, connections to said engaging means, and additional means adapted to bring said connections into cooperation with said member to be operated thereby to disengage said elements from the operating means at the end of an adding operation and disengage them differentially after complemental entries during a subtraction operation, and means for selectively conditioning said other means and said additional means for an adding or subtracting operation.

10. In a record controlled machine, means for analyzing data on the record, a counter comprising a plurality of adding elements, a driving means, separate devices under control of said analyzing means for engaging each of said elements with the driving means, actuators connected to said devices, a constantly moving operator for said actuators, and means under control of the analyzing means for moving the actuators separately into cooperation with the operator which then disengages the related elements from the driving means.

11. In a machine controlled by perforated records, record sensing devices comprising an electric circuit and a magnet energized according to the location of a perforation in the record, a driving means, a counter element, a clutch device for connecting said element with the driving means, means for operating said clutch device, a pawl cooperating with said clutch operating means, a rotating ratchet gear, and means under control of said magnet for engaging said pawl with said gear to operate the clutch operating means and disconnect the counter element.

12. In a record controlled machine of the class described, in combination, an accumulator having a set of adding elements, coordinated operating devices individually associated with said elements, means for rendering the operating devices effective at the beginning of an adding cycle, a moving notched member, a plurality of pawls, one for each element and each connected to a related operating device, and means under control of said record for positioning said pawls to be positively actuated by said member for rendering said operating devices ineffective at differential times coincident with the analyzing of the index points of the record to enter the complement of a number represented by said index points.

13. In a record controlled machine, in combination, an accumulator comprising a plurality of adding elements, a driving shaft, clutches for connecting said elements to said driving shaft, means for rendering a plurality of normally ineffective clutches effective to normally enter "9" in each of certain elements of the accumulator, a constantly moving ratchet gear, and pawls connected to said clutches and brought into the path of said gear under control of said record and operated by said gear for rendering the clutches individually ineffective at times coincident with the analyzing of index points of the controlling record.

14. In a record controlled machine, an accumulator having a series of adding elements, normally disconnected clutches individual to said elements and record controlled means for initiating connection of the clutches at a fixed time, a record controlled magnet for each element, a moving notched member, and a series of pawls each moved by a related magnet into cooperation with said member for placing the clutches under control of said member at differential times to disconnect the clutches and enter a complement of a number in the accumulator.

15. In a record controlled machine, an accumulator comprising a plurality of denominational order elements, means for operating said elements, a plurality of means for engaging and disengaging said elements and said operating means, means for moving said engaging means for beginning an entry operation in the higher order elements of the accumulator early in the operating cycle but one index point later than entry in the units order element, analyzing devices for the records, a continuously operating actuator, normally ineffective connections from said actuator to each engaging means associated with a separate one of the elements, and means for making the connections effective for terminating the entry operation in the various orders coincident with the analyzing of the index points of a record.

16. An accounting machine comprising means for analyzing records bearing index points, a single set of accumulating devices for adding numbers represented by the index points or complements thereof, control means for the devices to enter complements therein comprising means for initiating operation of said devices at a predetermined time, a moving notched member, pawls adapted to be operated by said member, and means controlled by the analyzing means for bringing said pawls into cooperation with said member for positively interrupting operation of the devices at differential times in accordance with index points to enter complements of items represented thereby into the accumulating devices, additional control means for said devices including said initiating means controlled by said analyzing means for initiating operation thereof at differential times in accordance with index points and means including said interrupting means for positively interrupting operation of said devices at a predetermined time to enter numbers represented by the index points into the devices, and means controlled in accordance with classification index points on records for selectively placing the accumulating devices under the influence of said control means or said additional control means.

17. In a machine of the class described, an accumulator element, a driving means, a clutch for engaging the element with the driving means, means for operating the clutch, means for actuating said clutch operating means at differential times to engage the element, a constantly moving notched member, connections to said clutch operating means, other means for bringing said connections into the path of said member to be operated thereby to operate the clutch to disengage the element at the end of an adding cycle, means for operating said actuating means to condition the clutch to engage the element early in a subtracting operation, and additional means for bringing said connections into cooperation with said member to operate the clutch to disengage the element at a differential time after a complement entry.

CLAIR D. LAKE.